United States Patent [19]

Gier

[11] 4,448,440

[45] May 15, 1984

[54] COLLAPSIBLE HAND TRUCK

[76] Inventor: Rolland H. Gier, 2013 Harold, Salina, Kans. 67401

[21] Appl. No.: 16,398

[22] Filed: Mar. 1, 1979

[51] Int. Cl.³ .............................................. B62B 1/04
[52] U.S. Cl. .................................. 280/655; 280/47.29
[58] Field of Search .............. 280/651, 652, 655, 654, 280/47.13 R, 47.27, 47.29, 47.37 R, DIG. 3

[56] References Cited

U.S. PATENT DOCUMENTS

| | | | |
|---|---|---|---|
| 1,719,763 | 7/1929 | Gullborg | 280/47.27 |
| 3,043,603 | 7/1962 | Major, Sr. | 280/47.29 X |
| 3,788,659 | 1/1974 | Allen | 280/42.27 X |
| 3,947,054 | 3/1976 | Hall | 280/654 X |
| 4,062,565 | 12/1977 | Holtz | 280/655 |
| 4,121,855 | 10/1978 | Mortenson | 280/654 |

Primary Examiner—Robert J. Spar
Assistant Examiner—Donald W. Underwood
Attorney, Agent, or Firm—Robert E. Breidenthal

[57] ABSTRACT

A hand truck wherein the load supporting platform is pivoted to swing from its operative position to a substantially flush and collapsed position against the front of the lower part of the frame, and wherein the upper and handle portion of the frame is pivoted to the lower part of the frame to swing from its operative position to a collapsed position overlapping the platform when the latter is collapsed. A fastener is provided for alternatively securing the upper portion of the frame in its operative and inoperative positions.

3 Claims, 7 Drawing Figures

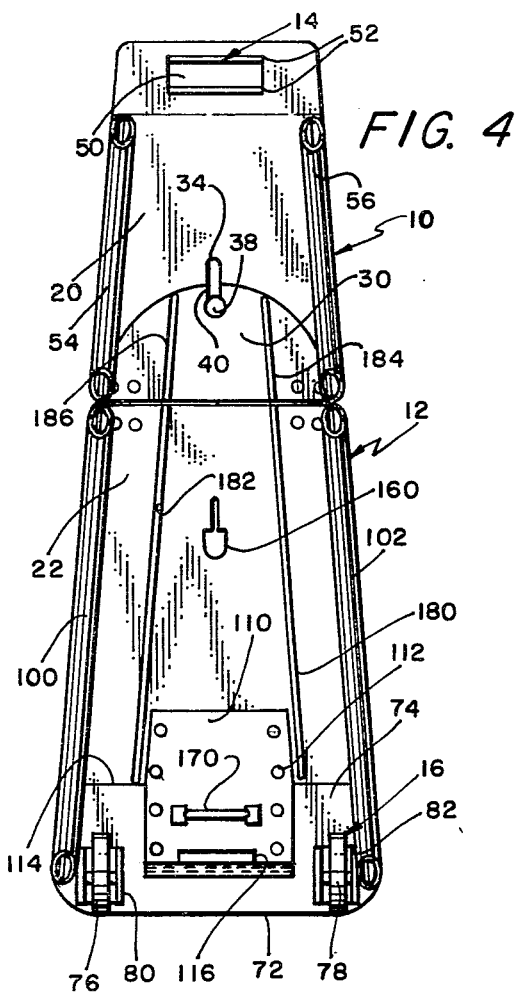
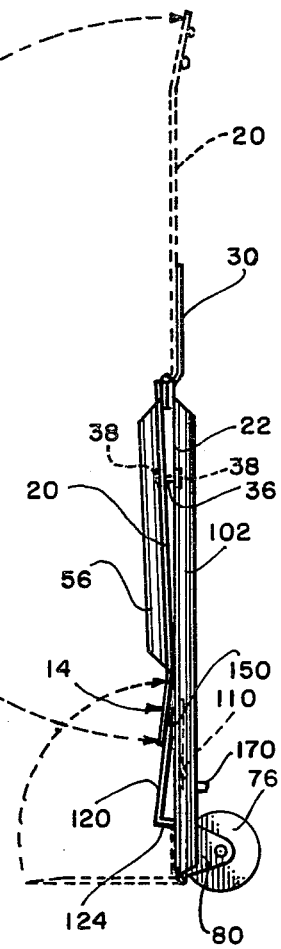
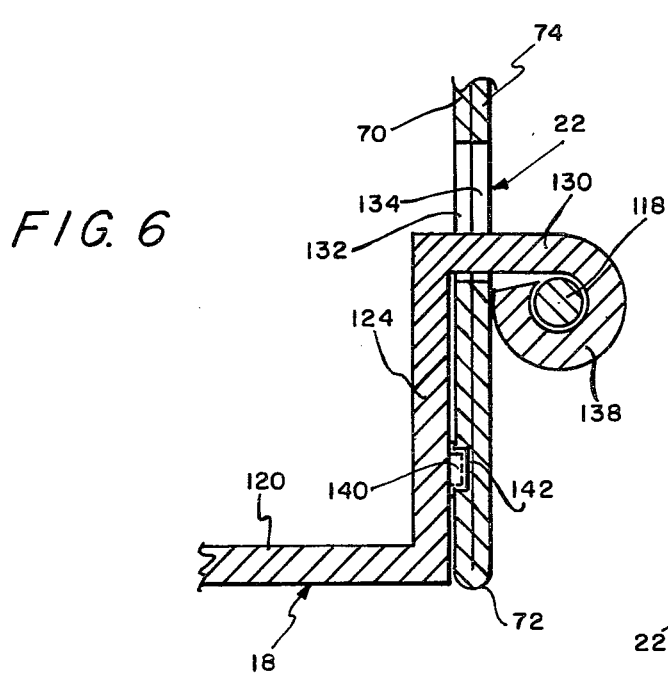
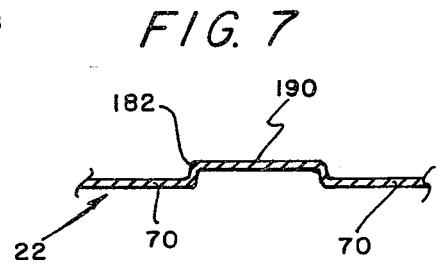
FIG. 4
FIG. 5
FIG. 6
FIG. 7

COLLAPSIBLE HAND TRUCK

The present invention relates to new and useful improvements in hand trucks, and more specifically pertains to an articulated hand truck that can be readily placed in and releasably retained in a compact collapsed condition for enhanced portability and efficient storage.

Many proposals have heretofore been made for equipment intended to reduce the labor, strains, and indeed actual physical injury of persons moving parcels, packages and the like, which may be large and/or heavy, from one location to another. Prominent among such equipment are hand trucks which have in general been very successful in attaining such objectives. As is well known, conventional hand trucks enable a single worker to move one or more parcels, which may be singly or collectively very bulky and/or heavy, from one location to a remote location with great mechanical advantage and with little or no risk to his sustaining a back injury or the like.

Despite the success of such hand trucks, there are some shortcomings of such trucks insofar as the compactness and/or portability of the trucks are concerned when such hand trucks are not in use in transporting loads; between jobs, so to speak.

For example, a delivery and/or parcel pickup service may entail the person performing such service driving a truck to a point of service, and on stopping at such point removing the hand truck from the truck and then using the latter to wheel a parcel to the door of the designated recipient. Having made such delivery, the hand truck must be then wheeled back to the truck and loaded therein. Wheeling the hand truck back or carrying the same back to the truck when in its operative condition can be quite inconvenient, especially if crowded sidewalls or elevators must be used. Then too, the operative hand truck is so bulky as to require otherwise useful space on the truck and to be somewhat cumbersome to place aboard or to remove from the truck. A corresponding inconvenien is encountered on making a pickup as that described on making a delivery.

It is the paramount objective of the present invention to provide a hand truck that is readily convertible from on operative condition to a compact collapsed condition (and vice versa) that can be easily hand carried, placed in or removed from a truck, and which can be stored in a minimum amount of space adjacent the truck driver's operating position.

Another objective in accordance with the above objective is to provide such a convertible hand truck wherein the same includes a provision enabling efficacious selective retention of the hand truck in either its operative or its collapsed (compact) condition.

Other objectives are to provide a hand truck in accordance with the objectives given above that is of moderate cost, possess a high strength weight ratio, and which is yet both highly reliable and durable in use.

Broadly the present invention involves in a hand truck of the class wherein an elongated and generally planar frame is adapted to be manually held at its upper end, and wherein the lower end of the frame is provided with a load supporting and generally planar platform on one side of and sharply inclined thereto, together with a pair of ground wheels on the side of the frame opposite the platform, the improvement comprising the platform being pivotally secured to the lower end portion of the frame for swinging movement toward the upper end of the frame between its operative position in which it is sharply inclined to the frame to a collapsed position thereof in close proximity to and in approximate parallelism with the lower end portion of the frame, means pivotally connecting the upper and lower end portions of the frame for swinging movement of the upper end portion of the frame from its operative position in which it is generally coplanar with the lower portion of the frame to a collapsed position wherein the same extends toward the lower frame end from its pivotal connection to the latter in close proximity and in approximate parallelism to the lower portion of the frame.

Other objectives as well as many features and advantages of the invention will become apparent during the following description of a preferred embodiment thereof that is presented in conjunction with the accompanying drawings, wherein:

FIG. 4 is a rear elevational view of the hand truck in operative condition with hidden details being shown in dashed outline;

FIG. 5 is a side elevational view of the hand truck showing the same in its collapsed condition with alternate positions of the upper frame portion 20 and the load supporting platform or foot 18 being shown in dashed outline;

FIG. 6 is an enlarged and fragmentary sectional detail view taken upon the plane of the section line 3—3 in FIG. 2; and, FIG. 7 is an enlarged and fragmentary view of a reinforcement detail, such view being taken upon the plane of the section line 7—7 in FIG. 2.

Figure 1:
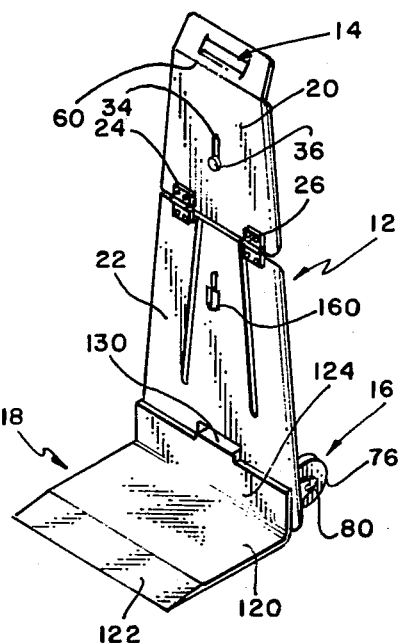
FIG. 1 is an isometric view of the hand truck in its operative condition.

Referring now to the drawings wherein like parts designate like parts throughout the various views, the reference numeral 10 designates the hand truck generally, the same being comprised from its operative condition viewpoint broadly of an elongated frame 12 having handle means 14 at one end and being provided at its other end with a ground support wheel means 16 on one side and a support platform or foot means 18 on the other side. Except for details hereinafter to be pointed out, the hand truck 10 as thus far described corresponds generally to conventional hand trucks in very widespread common usage.

Proceeding now with a description of details of the hand truck 10 constituting departures from the conventional, the frame 12 comprises upper and lower portions 20 and 22, respectively, that are hingedly connected by a pair of spaced hinges 24 and 26. The lower frame portion 22, which is of generally planar configuration, includes an integral and rearwardly offset planar upperward extension 30 in parallelism therewith so as to underlie and engage the rear side of the generally planar upper portion 20, when the forward sides of the frame portions 20 and 22 are in coplanar relationship. It will be evident that such coplanar relationship corresponds to a limiting position of the swinging movement of the upper frame portion permitted by the hinges 24 and 26.

Figure 2:
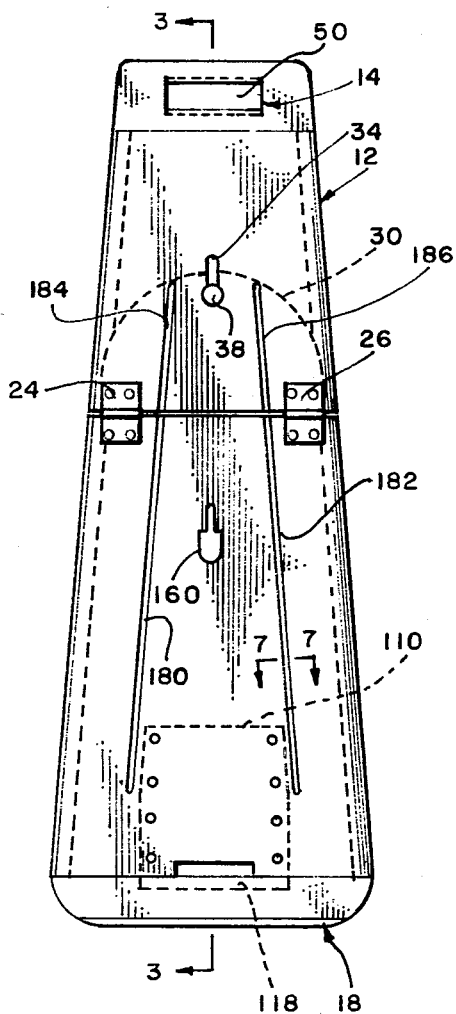
FIG. 2 is a front elevational view of the hand truck in operative condition with hidden details being shown in dashed outline.
Figure 3:
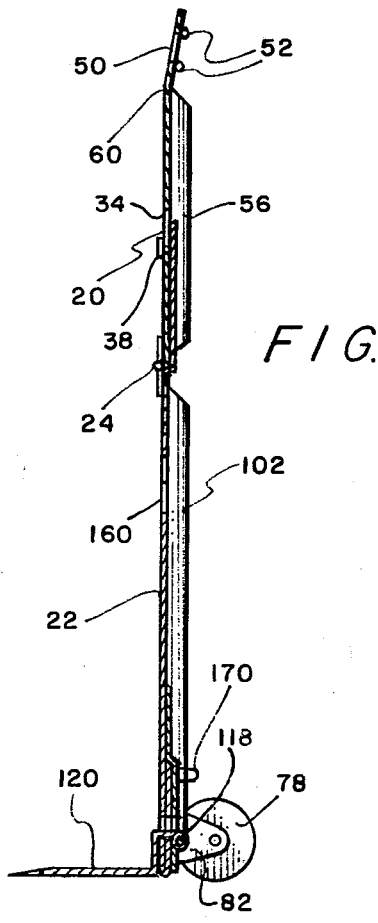
FIG. 3 is a central sectional view of the hand truck in operative condition taken on the plane of the section line 3—3 in FIG. 2, with hidden details being shown in dashed outline.

Means are provided for releasably retaining the frame portions 20 and 22 in the coplanar relationship thus far described and shown in FIGS. 2, 3 and 4. Such means comprising a hongitudinally extending slot 34 in the upper frame portion 20, and an elongated pin 36 extending therethrough that has enlarged opposite extremities 38. The upper end of the extension 30 is provided with a slot 40 in an arrangement such that the pin 36 can be moved up out the slot 40 as well as down into the slot 40, with the headed enlargements 38 effecting the desired retention when the pin 36 is lowered into the slot 40. In this regard, it will be noted that gravity opposes inadvertent dislodgment of the pin from the slot 40. It will be presently be shown that the slot 34 and the pin 36 have another function.

The upper frame portion 20 can conveniently be formed of metallic plate with aluminum being preferred. The handle means 14 is constituted of a slot 50 in the upper frame portion 20 with edge margins of the plate of which the latter is fabricated being turned rearwardly as indicated at 52 to define a comfortable hand hold.

The side marginal edges of the plate constituting the upper frame portion are rolled rearwardly to define integral tubular-like reinforcing 54 and 56 for optimizing the strength to weight ratio of the structure. For a purpose presently to become evident, the upper end or handle part of the upper frame portion 20 is bent a small angle along a line 60 so as to extend upwardly and rearwardly therefrom as clearly shown in FIGS. 1 and 3.

The lower frame portion 22 is preferably also fabricated largely of heavy aluminum sheet material and comprises a plate 70 that is integrally folded back upon itself at 72 so that the folded portion 74 reinforces the lowermost extent of the lower frame portion 22 as best shown in FIG. 6. The ground wheel means 16 comprises a pair of conventional ground support wheels 76 and 78 rotatably carried by U-shaped mounting brackets 80 and 82, such brackets being fixedly secured by suitable means, not shown, to the overlapping plates 70 and 74 adjacent the lower end or folded edge 72 of the lower frame portion 22. The brackets 80 and 82 are widely spaced from each other, and are disposed immediately adjacent rolled margins 100 and 102 of the lower frame portion 22 as best shown in FIG. 4. The tubular-like reinforcements 100 and 102, like other portions of the frame 12, are preferably aluminum for a high strength to weight ratio as well as from the standpoint of other considerations, such as appearance and corrosion resistance in moist environments.

The platform means 18 is pivotally connected to the lower frame portion 22 by means that comprises an aluminum hinge plate 110 riveted as at 112 to the rear side of the lower frame portion 22 at positions both above and below the upper edge 114 of the folded portion 74. The lower end of the hinge plate 110 is bifurcated, and bifurcated as at 116, and a shaft 118 has its opposite ends suitably secured to the plate 110 so as to extend across the bifurcation 116. The lower end portion of the plate 110 is bent rearwardly from the back side of the lower frame portion 22 so as to space the shaft 118 from the lower frame portion as shown in FIG. 6.

The platform means 18 comprises a plate 120 having a beveled or sharpened front marginal edge 122, and the rear of the plate 120 is integral with an upstanding plate 124 that substantially seats flush against the lower front margin of the lower frame portion 22 when the hand truck is in operative condition as shown in FIG. 1. The upper central portion of the plate 124 is pivotally secured to the shaft 118 by means of an integral rearward extension 130 of the central portion of the plate 124 extending through suitable openings 132 and 134 in the plates 70 and 74 and thence being bent about the shaft 118 as shown in FIG. 6 to constitute a somewhat loose bearing 138. The bearing 138 is somewhat loose about the shaft 118 to minimize any likelihood of becoming jammed.

Releasable means are provided for opposing clockwise movement of the platform means 18 about the pivot shaft 118 as viewed in FIG. 6, such means comprising coacting snap fasteners 140 and 142 respectively recessed in the plate 124 and the plate 70. The snap fasteners 140 and 142 are conventional per se and can be such as commonly used in the garment industry, are more of a size such as used in tentage for the fastening of large flaps or securance of large tarpaulins. Though recessed as indicated previously, the fastener components 140 and 142 are sufficiently exposed that they coact and releasably secure to each other on the platform means 18 being urged counterclockwise toward the position shown thereof in FIG. 6. As thus far described, the relationship of the positions of the platform means 18, the support wheel means 16, the strength of the snap fasteners 140 and 142, and the location of the center of mass of the hand truck 10 in its operative condition is such that the hand truck 10 can rest stably upon a horizontal supporting surface in the upright position shown thereof in FIG. 1.

It will be readily understood by those skilled in the art that, if deemed necessary or expedient, magnetic holding means (not shown) of the general type used for door retainers and the like can be used in lieu of the snap fastening means.

The platform means 18 can be swung clockwise from the position shown thereof in FIG. 6 upon the application of sufficient torque to separate the snap fastener components 140 and 142 to a position wherein the beveled margin 122 of the plate 120 seats against the forward side of the lower frame portion 22 as indicated at 150 in FIG. 5. With the beveled margin 22 so seated, the platform means 18 is in its collapsed position, with the plate 120 being inclined forwardly and downwardly from the forward side of the lower frame portion 22 at an angle that corresponds to the previously described bend of the upper frame portion 20 about the line 60. The arrangement is such that upon raising the pin 36 from the slot 40, the upper frame portion 20 can be swung about the axis of the hinges 24 and 26 to a position wherein the forward side of the upper frame portion is substantially parallel to and seated against the forward side of the lower frame portion 22 with the uppermost part of the upper frame portion 20 that includes the handle means 14 overlapping the plate 120 previously disposed in its collapsed position as shown in FIG. 5. The arrangement is such that when the upper frame portion 20 is in the collapsed position shown thereof in FIG. 5, the same overlaps and retains the platform means in its collapsed position.

Means is provided for retaining the upper frame portion 20 in the collapsed position shown thereof in FIG. 5. Such means comprises the lower frame portion 22 being provided with a keyhole slot 160 having its enlarged end lowermost as shown in FIGS. 1, 2 and 4. The slot 160 coacts with the previously described slot 34 and pin 36 for releasably retaining the upper frame portion 20 in its collapsed position as will now be described.

When the upper frame portion 20 is in its collapsed position, the slots 34 and 160 are juxtaposed or overlie each other in such a manner that the pin 36 can be extended through the enlarged lower end of the slot 160 and the pin 36 thence moved upwardly into the narrow portion of the slot 160 so that the headed ends 38 of the pin 36 hold the frame portions against separation. A carrying handle 170 is suitably secured to the hinge plate 110, and such handle 170 can conveniently be of the type such as commonly provided on sash type windows. When the hand truck 10 is in the collapsed or portable condition shown in FIG. 5, the same can be conveniently by the user pressed between his arm and his body, or carried by the handle 170. In the latter event, it will be noted that the pin 36 is gravitationally urged toward the narrow end of the slot 160 so as to preclude inadvertent release of the hand truck 10 from being secured in its collapsed condition. The latter desired result is because the lower frame portion 22 is inverted from the position shown thereof in FIG. 5 when being carried by the handle 170.

The handle 170 serves an additional useful function in that it can be used as a kick bar such that the user's foot can be applied to initiate motion or aid in traversing minor obstacles such as a crack in a sidewalk.

If desired, or deemed expedient, additional rigidity may be imparted to the lower frame portion 22 and its extension 30 by being formed with stress ribs as indicated at 180, 182, 184 and 186. The stress ribs are identical to each other and the rib 182 is shown in enlarged section in FIG. 7, wherein it will be seen that the sheet or plate 70 constituting the lower frame portion 22 has been stamped to form a rearwardly displaced rib web 190.

In the preferred construction, the overall configuration of the frame 12 tapers in its lateral dimension as shown from the platform to its handle end. Such configuration is of appealing appearance (more so than if strictly rectangular it is thought), and corresponds to the frame 12 being larger where bending moments are larger in conformity with the objective of a high strength to weight ratio.

Having fully described my invention and having made its construction and mode of operation clear, attention is now directed to the appended claims in order to ascertain the actual scope of the invention.

I claim:

1. In a hand truck of the class wherein an elongated and generally planar frame inclusive of upper and lower portions is adapted to be manually held at its upper end and wherein the lower end of the frame is provided with a load supporting and generally planar platform disposed on one side of and sharply inclined thereto for operative use, together with a pair of ground wheels mounted on the lower end of the frame and disposed for operative use on the other side of the latter opposite the platform, the improvement comprising the platform being pivotally secured to the lower end portion of the frame for swinging movement toward the upper end of the frame between its operative position in which it is sharply inclined to the frame to a collapsed position thereof that is on said one side of the frame and in close proximity to and in approximate parallelism with the lower end of the frame, means pivotally connecting the upper and lower end portions of the frame for swinging movement of the upper end portion of the frame from its operative position in which it is generally coplanar with the lower portion of the frame to a collapsed position wherein the same extends toward the lower frame and from its pivotal connection to the latter and wherein the same is on said one side of and in close proximity to and in approximate parallelism to the lower portion of the frame, the arrangement being such that the platform and the upper end portion of the frame overlap each other along the longitudinal extent of the lower portion of the frame when such components are in their collapsed positions with one of such components and the lower frame having the other component sandwiched therebetween, whereby securing said one of such components in its collapsed position serves to retain the other in its collapsed position, and said truck including means for securing said one component in its collapsed position, with the last recited means being included in a common means for selectively and releasably securing the upper portion of the frame to the lower portion of the frame in its operative position and in its collapsed position.

2. The combination of claim 1, wherein the common means comprises the upper portion of the frame having a slot therein with a pin extending through and slidable therein, said pin having enlarged extremities preventing removal of the pin from the slot, said lower portion of the frame having first and second slots therein that are respectively in registry with the first mentioned slot when the upper portion of the frame is in its operative and collapsed positions, with the pin having one of its enlarged extremities engageable with the lower portion of the frame through the first and the second slots respectively when the upper portion of the frame is in its operative and collapsed positions.

3. The combination of claim 2, including means operative upon the platform being in its operative position for releasably retaining the same in such position.

* * * * *